United States Patent
Charpentier et al.

(10) Patent No.: US 8,074,782 B2
(45) Date of Patent: Dec. 13, 2011

(54) HIGH RATE PREFORM FEEDING DEVICE

(75) Inventors: Alain Charpentier, Octeville sur Mer (FR); Eric Leroux, Octeville sur Mer (FR); Gérard Perrot, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 212 days.

(21) Appl. No.: 12/296,483

(22) PCT Filed: Apr. 12, 2007

(86) PCT No.: PCT/FR2007/000615
§ 371 (c)(1),
(2), (4) Date: Apr. 3, 2009

(87) PCT Pub. No.: WO2007/116155
PCT Pub. Date: Oct. 18, 2007

(65) Prior Publication Data
US 2009/0308714 A1 Dec. 17, 2009

(30) Foreign Application Priority Data
Apr. 12, 2006 (FR) ...................... 06 03223

(51) Int. Cl.
*B65G 47/14* (2006.01)
(52) U.S. Cl. ........................ 198/396; 198/408
(58) Field of Classification Search .................. 198/392, 198/396, 408
See application file for complete search history.

(56) References Cited

U.S. PATENT DOCUMENTS

| | | | |
|---|---|---|---|
| 3,650,368 A * | 3/1972 | Nalbach | 198/397.05 |
| 4,007,854 A | 2/1977 | Ervine | |
| 4,429,808 A * | 2/1984 | Doty | 221/167 |
| 4,705,156 A | 11/1987 | Boling | |
| 5,044,487 A * | 9/1991 | Spatafora et al. | 198/392 |
| 5,145,051 A * | 9/1992 | Hoppmann | 198/396 |
| 5,299,675 A * | 4/1994 | Schumann et al. | 198/392 |
| 5,544,732 A * | 8/1996 | Schmitt | 198/392 |
| 6,311,825 B1 * | 11/2001 | Schmitt | 198/392 |
| 6,578,699 B2 * | 6/2003 | Baird et al. | 198/392 |
| 7,472,782 B2 * | 1/2009 | Corbin | 198/392 |
| 2003/0010605 A1 | 1/2003 | Baird et al. | |

FOREIGN PATENT DOCUMENTS

| | | |
|---|---|---|
| EP | 0 305 355 A1 | 3/1989 |
| FR | 2 539 721 A1 | 7/1984 |
| FR | 2 675 481 A1 | 10/1992 |
| FR | 2 816 297 A1 | 5/2002 |
| FR | 2 864 051 A1 | 6/2005 |
| JP | 11-240615 A | 9/1999 |
| JP | 2005-272114 A | 10/2005 |
| WO | 89/05273 A1 | 6/1989 |

* cited by examiner

*Primary Examiner* — Douglas Hess
(74) *Attorney, Agent, or Firm* — Sughrue Mion, PLLC

(57) ABSTRACT

Centrifugal feeder device having an outer enclosure (2) which accommodates a ring (3) mounted rotatably in the enclosure (2) and lying in an approximately horizontal plane, and a disc (4) rotatable in the ring (3). The axis (5) of rotation of the disc (4) is inclined with respect to the axis (6) of rotation of the ring (3), the disc (4) and the ring (3) approximately tangent to each other in a transfer area (10) and distant from each other in a loading area (8). The ring (3) is surrounded by a lateral guide (15). The ring (3) supplies an outlet channel (13) whose inlet is situated above a part of useful width of the ring, the ring (3) is provided with approximately radial notches (3*a*), and the device includes a mechanism for adjusting the useable width of the ring (3).

17 Claims, 3 Drawing Sheets

HIGH RATE PREFORM FEEDING DEVICE

The invention relates to the technical domain of the manufacturing processes for hollow bodies of thermoplastic material, particularly containers, such as pots, flasks or bottles, processes in which a preform is first manufactured by injection before obtaining the final container during a blowing or drawing-blowing stage.

There is a beneficial application for the invention in container blowing installations, for example, for polyethylene terephthalate (PET) from preforms previously molded by injection, preforms that are introduced into the thermal conditioning furnace, constituting a part of the installation before being transferred to the actual blowing area of the installation.

It is pointed out that a preform is a more or less tubular object closed at one axial end, the opening of which exhibits the ultimate shape of the final hollow body.

For a number of years the manufacture of containers of plastic material from previously injected material has expanded quite rapidly, thanks to the use of polyethylene terephthalate (PET). Meanwhile, other materials have been considered and/or used more or less successfully such as, for example, polyethylene napthalate (PEN), polypropylene (PP) or mixtures or superimpositions of various materials.

In the blowing installation, the preforms are dumped altogether into a tub or hopper. They are conventionally drawn from this tub by an elevating conveyor which then dumps them onto the upper end of an alignment hopper. The preforms slide to the bottom of the hopper where they are recovered in a feed rail, which is itself connected to the blowing machine.

High rate blowing installations typically contain a large number of blowing or drawing-blowing units mounted on a carrousel type rotating machine.

The carrousel type blowing installations make it possible to achieve high rates of production. Thus, for example, for a material such as PET, it is possible to produce more than 1,500 containers per hour per mold.

A particularly delicate operation, based on the use bulk preforms, consists of correctly orienting them for intake into the blowing machine. This operation is complex for the current blowers operating at a rate that can reach 50,000 bottles an hour.

The applicant has developed disentangling and alignment hoppers, as well as preform feed rails for blowing machines, including for some of the ejection devices with means of permitting the evacuation of preforms that are poorly oriented, overlapping, or joined together, these means being described for example in the documents FR 2 675 481, FR 2 816 297 and FR 2 864 051.

The preform feed rails comprise two motorized parallel rollers rotating in the opposite direction and inclined in relation to the ground. The spacing between the rollers is adjustable and calculated to allow the passage of the body of the preforms, but not their flange. The preforms are dumped at the top of the rollers and then lodge between the rollers due to the force of gravity. The incline of the two rollers and their rotation enables the preforms, suspended by their flange to move.

There is a demand for blowing machines permitting manufacturing rates much greater than those currently attained.

The applicant has noted that in order to feed at a manufacturing rate of 80,000 bottles or more an hour, very long feed rails must be provided; so as to incorporate a preform feed buffer area. Poorly positioned alignment devices or else poorly positioned preform ejection devices actually cause irregularities in the flow of preforms.

Therefore, it is important to lay out a more or less constant number of preforms at the intake of the blowing machine.

The utilization of very long feed rails results in the need to place the preform orientation system several meters above the ground. Servicing by the operators and maintenance are disconcerting at heights of several meters.

The utilization of very long feed rails, moreover, entails the use of a significant amount of floor space.

Another solution contemplated to permit high rates was to lay out two parallel devices, the outlet rails of which end at a junction point. However, this solution poses the problems at the junction stage where some preforms can get stuck.

In an attempt to resolve the problems of the various known solutions, document FR 2 850 641 proposes the establishment of a cylindrical receptacle equipped with two superimposed trays rotating above an inclined circular sliding plate, the two trays rotating in the opposite direction to one another. The diameter of the upper tray is less than that of the lower tray. The lower tray is equipped with pigeonholes sized such that they can only hold a single preform. The sliding plate is equipped, in the high part of the receptacle, with an oblong slit on an approximately 90° arc sector. The preforms are dumped out into the lower part of the receptacle, the area where the preforms then lodge in the pigeonholes of the lower tray. When a pigeonhole lodging a preform comes to the level slit of the sliding plate, the preform tips, then drops from the container.

The device described in document FR 2 850 641 exhibits the following drawbacks.

In the first place, this device cannot be used for different types of preforms. The oblong slit for tipping the preforms has two well determined widths for a given type of preform: the first width is less than the diameter of the flange, but greater than the diameter of the body of the preform.

Moreover, the filling of the pigeonholes is done at the low point of the inclined receptacle, this low point constituting an accumulation area where the overlapped and jointed together preforms would then stagnate, the operator being unable to see them immediately.

The invention seeks to compensate for the above-mentioned problems by proposing a new preform feeding device for blowing machines, which can, if necessary, reach very high rates, capable, for example, of exceeding 80,000 preforms per hour.

According to a first aspect, the invention concerns a centrifugal feed device comprising an outside enclosure receiving on the one hand a ring mounted so as to rotate within the enclosure and extending into a more or less horizontal plane, and on the other a disc mounted so as to rotate inside of said ring, the axis of rotation of the disc being inclined in relation to the axis of rotation of the ring, the disc and the ring being more or less tangent to one another in a transfer area and being distant from one another in a loading area located at a level lower than that of the transfer area, the ring being surrounded by a lateral guide defining, with the inside lip of the ring, a useful width of the ring serving an outlet channel, the intake of which is located above a part with the useful width of the ring, the ring being equipped with more or less radial teeth, the device comprising the means making it possible to adjust the useful width of the ring.

Thus, "useful width" designates herein the width of the surface of the ring or the part of the ring used when operating the device, this width being measured along a radial direction to the axis of rotation of the ring.

In one execution, the means permitting the adjustment of all or a portion of the useful width of the ring constitute the means of movement of the lateral guide; they comprise the mounted curve guide sections radially sliding onto an integral support of the enclosure.

In a particularly advantageous execution, the ring is frustoconical such that the inside lip is at one level higher than its outside lip.

In an advantageous implementation, the device comprises means permitting independent adjustment of the rotating speed of the ring and of the disc, the ring rotating in the same direction as the disc and at a speed more or less equal to or greater than that of the disc.

According to a second aspect, the invention concerns a blowing machine for containers, particularly of PET or PEN, this machine including a device as presented above, for feeding it with preforms.

Other purposes and advantages of the invention will appear over the course of the following description of the methods of realization, provided as non-restrictive examples; this description being made in the light of the attached drawings, wherein.

Figure 1:
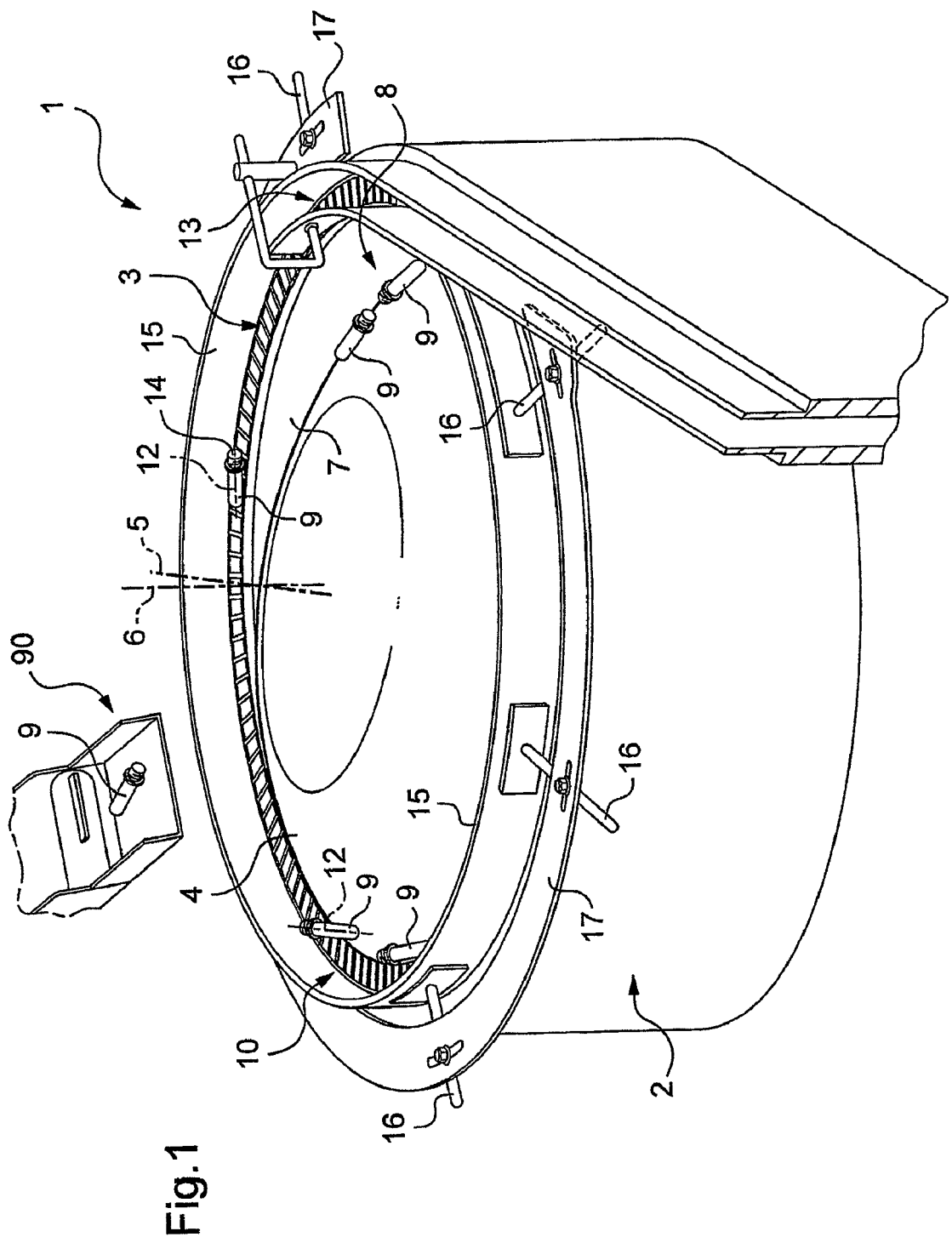
FIG. 1 is a schematic perspective view of a preform centrifugal feed device according to the invention.

The device 1 shown comprises a fixed cylindrical enclosure 2, this enclosure 2 accommodating on the inside a ring 3 and a disc 4, each rotating in enclosure 2.

The axis 5 of rotation of disc 4 is inclined in relation to axis 6 of rotation of ring 3, such that disc 4 is inclined with respect to ring 3. In the example illustrated in FIG. 1, axis 6 of rotation of ring 3 is more or less vertical, that is to say that ring 3 extends into a more or less horizontal plane. In one execution, the angle of incline between the two axes is about ten degrees.

The projection of the inside lip of ring 3 parallel to is axis 6 of rotation delimits a virtual cylinder, of axis 6, in which disc 4 is contained. Disc 4 is laid out such that a portion of its edge, in the mentioned area 10 on FIG. 1, is located in the proximity of the inside lip of ring 3, more or less at the level of the upper plane of the latter, and the portion of the diametrically opposed disc is located at the lower level. In other words, at the level of area 10, disc 4 and ring 3 are more or less tangent to one another. A lateral wall 7, the upper lip of which, more or less circular, is located in the proximity of and facing the lower lip of ring 3, surrounds disc 4 very closely. Thus, as a result of the incline of disc 4 relative to ring 3, disc 4 and the lateral ring define a hollow constituting a loading area 8 in which the preforms 9 can be dumped altogether, for example by a conveyor belt or any other means, such as the one diagrammed under reference 90 on FIG. 1, upon reaching above loading area 8.

As will be understood further on, area 10 constitutes an area for transferring the preforms 9 between disc 4 and ring 3.

A lateral guide 15, which will be described in detail later, is laid out relative to ring 3, so as to constitute a peripheral stop permitting the preforms 9 to remain on ring 3.

Ring 3 exhibits an adjustable radial width, through means that will be described in detail here following, enabling guide 15 to move over all or over a portion of ring 3. Ring 3 likewise exhibits radial teeth or projections 3a, regularly distributed over its perimeter.

Figure 2:
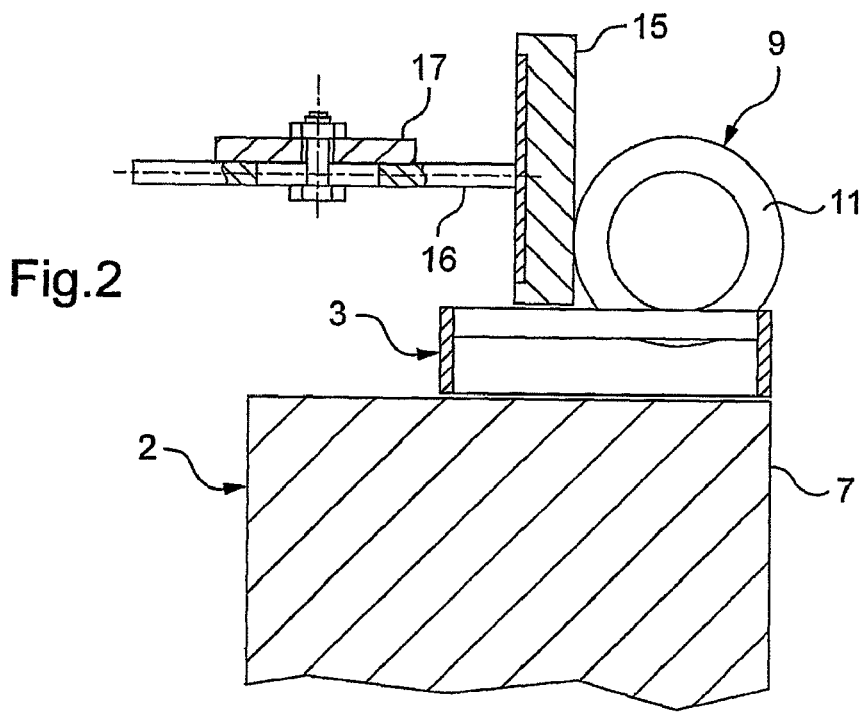
FIG. 2 is a detailed view of a device according to the invention.

For a given type of preforms, the operator adjusts all or a portion of the width of ring 3, such that this width is approximately equal to the maximum diameter of the preforms 9 loaded into the device. This maximum diameter corresponds most often to the outside diameter of flange 11 (visible in FIG. 2), of preforms 9. This adjustment serves to prevent two preforms 9 from being side by side on ring 3. The thus obtained width is called the "useful width" of ring 3.

Ring 3 and disc 4 are rotated by any appropriate motor means, the means enabling the separate adjustment of the rotating speed of ring 3 and disc 4.

In one method of execution, the diameter of ring 3 is approximately two meters, the rotating speed of ring 3 approximately sixty rotations per minute, and that of disc 4 is preferably slightly less.

The rotation of disc 4 causes the movement of the preforms from loading area 8 up to transfer area 10.

At this transfer area 10, the centrifugal force exerted by the rotation of disc 4 serves to convey preforms 9 onto ring 3 and the presence of teeth on ring 3 causes the hooking of the flanges 11 of preforms 9 onto this ring. Following the hooking, the rotation of ring 3, at a speed advantageously greater than that of disc 4 has the effect of leading each preform 9 to rest completely on ring 3, forming axis of preform 9 being more or less perpendicular to the axis of rotation of enclosure 2. Moreover, to counter the centrifugal force exerted by the rotation of ring 4, a lateral guide 15 is provided at least partially surrounding ring 3 and which will be described in detail later. Preferably ring 3 is conical and the taper is such that the inside lip of ring 3 is at a level greater than the outside lip, such that when device 1 stops, the preforms 9 located on ring 3 are kept on ring 3, upon being stopped against the lateral guide, by their own weight.

Due to the distance separating loading area 8 and transfer area 10, the rotation of disc 4 has the effect of leading a large number of preforms 9 into a favorable position for transfer to ring 3, forming axis 12 of these preforms 9 being already more or less perpendicular to the axis of rotation 6 of enclosure 2 when these preforms 9 slide along the lateral wall 7 of enclosure 2.

The preforms 9, which are not positioned with their forming axis 12 tangent to ring 3 are unbalanced in transfer area 10, and fall back onto disc 4.

The preforms carried by ring 3 exit device 1 by outlet channel 13 the intake of which is located above ring 3 and one side of which is placed in the extension of above-mentioned lateral guide 15, which will be described in detail later. It should be noted that the preforms enter into this outlet channel randomly with their opening 14 placed towards the outlet or opposite the outlet of channel 13.

In the example, the intake of channel 14 is in an area more or less diametrically opposed to transfer area 10. It should be noted that the diametrically opposed layout is not restrictive: it would be advisable above all that intake 13 be away from transfer area 10, such that, statistically, a sufficient number of preforms 9 reach it, which are correctly stabilized in view of the desired rate.

The means permitting the adjustment of the useful width of ring 3 to adapt to the various sizes of preforms 9 is now described.

Device 1 comprises an above-mentioned lateral guide 15 that is composed of more or less identical sections in a circular arc. This lateral guide 15 forms a circular lateral surface supporting the preforms 9 carried by ring 3. The lateral guide sections 15 are mounted, by means of radial rods 16, onto an integral external support 17 of enclosure 2. The radial sliding of these rods 16 with respect to external support 17 makes it possible to modify the width over all or part of rotating ring 3 left accessible to preforms 9. In other words, lateral guide 15 makes it possible to modify the width of the pathway formed by ring 3, a mobile pathway on which the preforms 9 are carried into transfer area 10.

Figure 3:
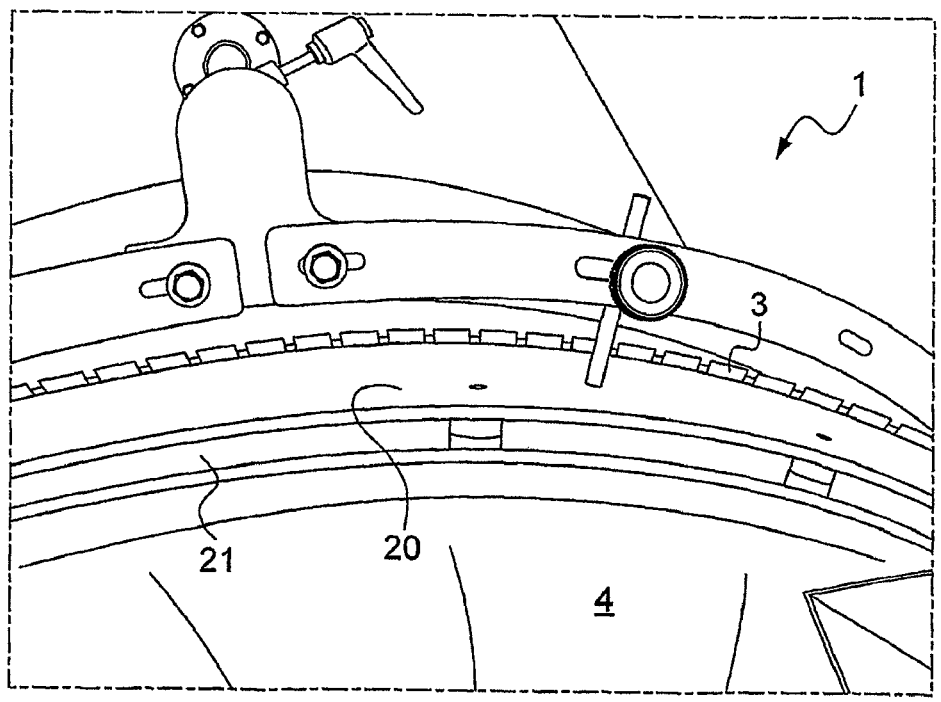
FIGS. 3 to 5 are three perspective views according to three angles of view of a part of a feed device according to an execution method of the invention.
Figure 4:
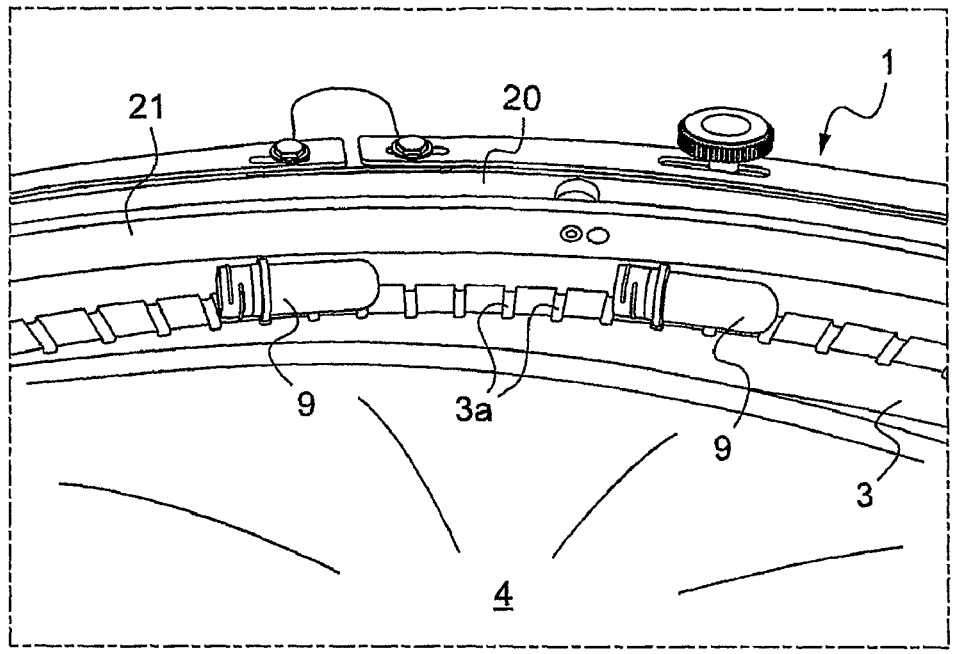
Figure 5:
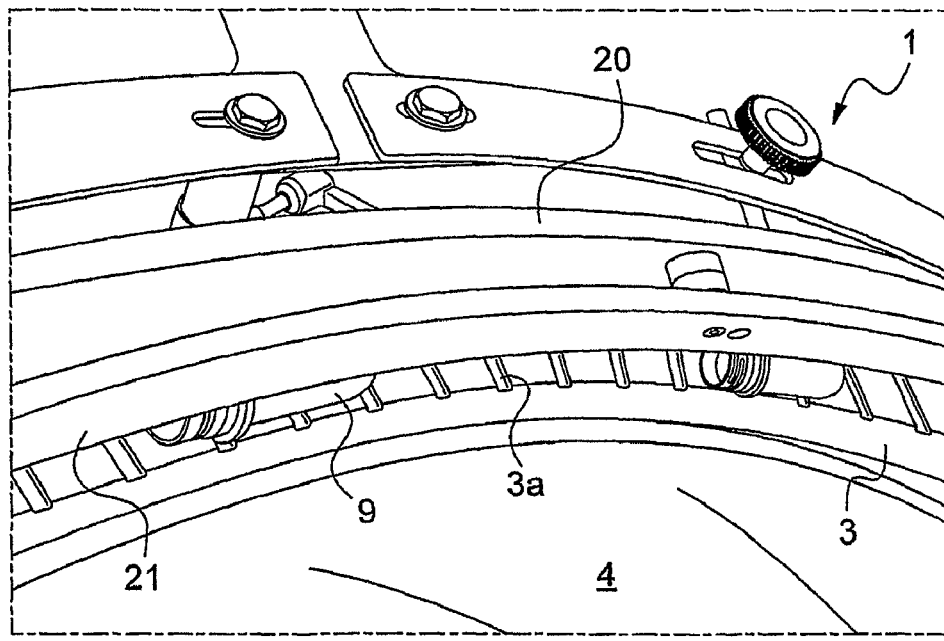

Now refer to FIGS. 3 to 5.

As was shown in FIG. 1, device 1, shown partially and in perspective on FIGS. 3 to 5, comprises an enclosure 2, a ring 3 and a disc 4, this disc 4 being conical. A conical shape for disc 4 facilitates the transfer of preforms 9 from the disc to ring 3 in transfer area 10.

Device 1 shown in FIGS. 3 to 5 comprises an outside lateral guide 20, defining a maximum useful width. A guide 21 forms an angular sector controlling the passage of preform 9 to ring 3. The position of guide 21 in enclosure 2 is adjustable.

Ring 3 is advantageously frustoconical, as was stated previously. In one execution, axis 6 of rotation of ring 3 is more or less vertical. In other modes of realization, axis 6 of rotation of ring 3 is inclined in relation to vertical, just as axis 5 of rotation of disc 4. Thus, the preforms do not necessarily exit horizontally from the device, which can thus feed an inclined conveyor.

The device exhibits numerous advantages.

In the first place it permits a very high rate of feed of preforms. Theoretically, with the previously indicated numerical values (two meter diameter, velocity of the ring at sixty rotations per minute), it is possible to distribute more than 200,000 ten centimeter long preforms per hour, assuming that the preforms are transferred onto the ring in single file. In fact, it easily exceeds the 80,000 prefectures per hour that was unattainable by the devices known to date.

The preforms 9 are transported onto the ring 3 more or less horizontally and are only tipped after exiting the device.

Furthermore, the enclosure can be placed horizontally and close to the ground, thus facilitating maintenance and repair service.

Adjusting the useful width of the ring or a part of the ring makes it possible to adapt the device to different preforms or other similar objects.

The invention claimed is:

1. A centrifugal feed device comprising an outside enclosure accommodating a mounted ring rotating in the enclosure and extending into a horizontal or approximately horizontal plane, and a mounted disc rotating inside said ring, the axis of rotation of the disc being inclined in relation to the axis of rotation of the ring, the disc and the ring being tangent or approximately tangent to one another in a transfer area and being remote from one another in a loading area located at a level lower than that of transfer area, the ring being surrounded by a lateral guide defining, with an inside lip of ring, a useful width of the ring, the ring serving an outlet channel having an intake located above a part with the useful width of the ring, the centrifugal feed device comprising means for permitting the adjustment of the useful width of the ring, the ring is equipped with radial or approximately radial teeth, a lateral wall of the enclosure having a circular or approximately circular upper lip located in the proximity of and facing the lower lip of the ring, the lateral wall surrounding the disc closely, the disc and the lateral wall defining a hollow that is the loading area.

2. A device according to claim 1, wherein the means for permitting the adjustment of the useful width of the ring comprises means for moving the lateral guide.

3. A device according to claim 2, wherein the means for moving the lateral guide comprises three guide curve sections, mounted so as to radially slide over an integral support of the enclosure.

4. A device according to claim 1, wherein the ring is frustoconical, such that the inside lip of the ring is at a level higher than that of an outside lip of the ring.

5. A device according to claim 1, comprising means for independently adjusting the rotating speed of the ring and the disc, the ring rotating in the same direction as the disc and at a speed approximately equal to or greater than that of the disc.

6. A blowing machine for containers, comprising a device according to claim 1 for feeding the machine with preforms.

7. The blowing machine for containers according to claim 6, wherein the performs are of the PET or PEN type.

8. The device according to claim 1, wherein the enclosure is fixed so as to be stationary relative to the ring and the disc.

9. A centrifugal feed device, comprising:
   an outside enclosure accommodating a mounted ring rotating in the enclosure and extending into a horizontal or approximately horizontal plane;
   a disc rotatably mounted radially inside the ring, the axis of rotation of the disc inclined in relation to the axis of rotation of the ring, the disc and the ring tangent or approximately tangent to one another in a transfer area and remote from one another in a loading area located at a level lower than a level of the transfer area;
   the ring surrounded by a lateral guide defining, with an inside lip of ring, an adjustable width portion of the ring, the ring serving as an outlet channel having an intake located above a part with the width portion of the ring; and
   a lateral wall of the enclosure having a circular or approximately circular upper lip located in the proximity of and facing the lower lip of the ring, the lateral wall surrounding the disc, and the disc and the lateral wall defining a hollow loading area.

10. The device according to claim 9, wherein width portion of the ring is adjustable by moving the lateral guide.

11. The device according to claim 10, comprising three guide curve sections configured to move the lateral guide, the three guide curve sections are mounted so as to radially slide over an integral support of the enclosure.

12. The device according to claim 9, wherein the ring is frustoconical, such that the inside lip of the ring is at a level higher than that of an outside lip of the ring.

13. The device according to claim 9, configured such that the rotating speed of the ring and the rotating speed of the disc are independently adjustable, including the ring rotating in the same direction as the disc and at a speed approximately equal to or greater than that of the disc.

14. A blowing machine for containers, comprising a device according to claim 9 for feeding the machine with preforms.

15. The blowing machine for containers according to claim 14, wherein the performs are of the PET or PEN type.

16. The device according to claim 9, wherein the ring comprises radial or approximately radial teeth.

17. The device according to claim 9, wherein the enclosure is fixed so as to be stationary relative to the ring and the disc.

* * * * *